Aug. 27, 1929.　　R. M. MACDONALD　　1,726,272
SHOCK ABSORBER
Filed Sept. 19, 1928
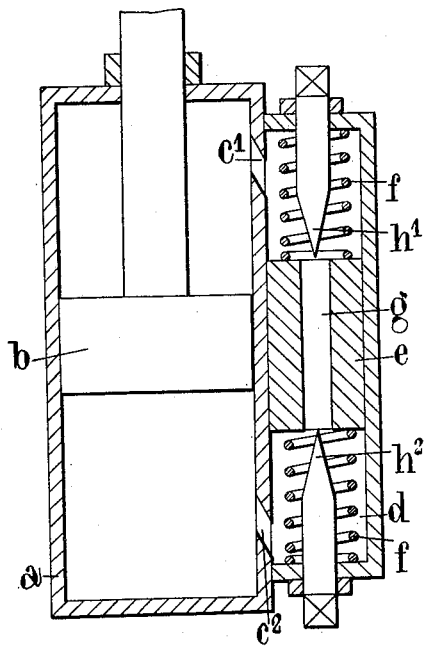
Ranald MacIntosh MacDonald
Marks & Clerk Patented Aug. 27, 1929.

1,726,272

UNITED STATES PATENT OFFICE.

RANALD MACINTOSH MACDONALD, OF HAMBLEDEN, CHRISTCHURCH, NEW ZEALAND.

SHOCK ABSORBER.

Application filed September 19, 1928, Serial No. 307,001, and in Great Britain August 4, 1927.

This invention relates to shock absorbers and while it is capable of general application it is particularly designed in connection with shock absorbers for use upon vehicles. Such shock absorbers have hitherto usually been of two kinds involving hydraulic and mechanical friction but in general the resistance to shock is independent of the size and strength of the shock with the result that if the device is designed or adjusted to be of sufficient strength to take up the largest shocks to which it is liable to be subjected it will be too stiff for the smaller shocks and vice versa if it is designed or adjusted especially for the small shocks it will not be sufficiently stiff to take up the larger shocks.

The principal object of the present invention is to overcome this drawback of existing shock absorbers, and to provide a shock absorber adapted automatically to adjust itself to the size or strength of the shock in such a manner that the resistance to shock will automatically increase with an increase in the magnitude of the shock.

A further object of the invention is to provide a shock absorber which will be double-acting, that is to say, capable of absorbing shocks in two directions so that it may take up shocks due both to deflection and to rebound of the springs.

Further features of the invention will be apparent from the description given hereafter, the invention being particularly indicated in the appended claim.

The figure is a sectional elevation of one convenient form of shock absorber in accordance with the invention.

In carrying my invention into effect in one convenient manner as, for example, in its application to a shock absorber for use upon a motor vehicle and as illustrated in the figure, I form my improved shock absorber with an external box, casing, or cylinder $a$ adapted to be filled with oil or other suitable fluid, such casing or cylinder being connected either to the vehicle axle or to the chassis and being formed with a cylindrical chamber in which is slidable a piston $b$, the piston rod of which is connected either to the chassis or to the vehicle axle.

The cylinder $a$ is provided with two ports $c'$ $c^2$ arranged upon opposite sides of the piston $b$ and communicating with a further cylinder or chamber $d$ formed in one with or suitably secured or connected to the cylinder $a$ and within the cylinder or chamber $d$ there is a slidable piston $e$ controlled by springs $f$ arranged upon either side thereof and having a port or passage $g$ formed therethrough adapted to be controlled by two needle valves $h'$ $h^2$.

The arrangement is such that when the device is subjected to shock the piston $b$ is caused to move in one direction thus subjecting the oil or other liquid in one end of the cylinder $a$ to pressure and forcing the same into the adjacent chamber $d$ under such pressure which causes the floating piston $e$ to be moved in relation to one of the needle valves or like controlling member so that the area of escape orifice for the oil from one end to the other of said chamber is proportioned to suit the strength of the shock; thus the greater the shock the smaller will be the area of the escape orifice and therefore the larger will be the resistance opposed by the device to the shock, and, furthermore, it will be noted that by reason of the construction described the device is adapted to operate equally well in both directions so that it will absorb shocks due both to deflection of the vehicle spring under load and also to rebound of the spring.

It is to be understood that the invention is not to be limited to the details of construction which are hereinbefore given by way of example since the invention extends broadly to a shock-absorber in which the resistance to shock will be automatically increased with increase in the magnitude of the shock and any arrangements equivalent to those hereinbefore described for attaining this object are to be considered as falling within the scope of the invention.

Having now described my invention what I claim as new and desire to secure by Letters Patent is:—

A hydraulic shock absorber having a cylinder and a plunger slidable therein, a chamber through which the fluid may flow from one side of the plunger to the other, a valve for said chamber movable in accordance with the magnitude of the shock and a spring for said valve, said valve controlling the flow of fluid through the chamber in accordance with the magnitude of the shock, said chamber being located externally of the cylinder and said valve comprising an axially apertured plunger movable in the chamber, and a coned stem at each end of the aperture adapted to close the same upon movement of the plunger.

In testimony whereof I have signed my name to this specification.

RANALD MACINTOSH MACDONALD.